United States Patent
Park

(10) Patent No.: US 11,318,622 B2
(45) Date of Patent: May 3, 2022

(54) WEARABLE ROBOT HAND DEVICE REMOVABLE FROM HAND STRUCTURE

(71) Applicant: KOREA INSTITUTE OF SCIENCE AND TECHNOLOGY, Seoul (KR)

(72) Inventor: Jaeyoung Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 17/101,551

(22) Filed: Nov. 23, 2020

(65) Prior Publication Data

US 2022/0072715 A1 Mar. 10, 2022

(30) Foreign Application Priority Data

Sep. 8, 2020 (KR) ........................ 10-2020-0114427

(51) Int. Cl.
| | |
|---|---|
| B25J 15/00 | (2006.01) |
| B25J 9/16 | (2006.01) |
| B25J 9/10 | (2006.01) |
| B25J 15/02 | (2006.01) |

(52) U.S. Cl.
CPC ......... B25J 15/0009 (2013.01); B25J 9/1045 (2013.01); B25J 15/0233 (2013.01)

(58) Field of Classification Search
CPC .... B25J 15/0009; B25J 15/0233; B25J 9/045; B25J 15/08; B25J 15/0491; B25J 15/0425; B25J 18/00; B25J 9/1045
USPC ............................... 294/111, 103.1, 106, 116
See application file for complete search history.

(56) References Cited

U.S. PATENT DOCUMENTS

| | | | | |
|---|---|---|---|---|
| 4,575,297 | A | * | 3/1986 | Richter .................. B25J 9/0006 414/5 |
| 4,740,126 | A | * | 4/1988 | Richter .................. B25J 9/0006 414/1 |
| 7,296,835 | B2 | | 11/2007 | Blackwell et al. |
| 10,888,487 | B1 | * | 1/2021 | Rogers ............... A41D 19/0044 |
| 2006/0145495 | A1 | | 7/2006 | Fang et al. |
| 2014/0222199 | A1 | * | 8/2014 | Ihrke .................... B25J 15/0009 700/253 |
| 2017/0168565 | A1 | * | 6/2017 | Cohen .................. A61B 5/0022 |
| 2017/0266075 | A1 | * | 9/2017 | Becchi .................... A63B 23/16 |

(Continued)

FOREIGN PATENT DOCUMENTS

| | | |
|---|---|---|
| KR | 1020150121515 A | 10/2015 |
| KR | 1020160003925 A | 1/2016 |

(Continued)

OTHER PUBLICATIONS

Seok Hwan Jeong et al., "Designing Anthropomorphic Robot Hand With Active Dual-Mode Twisted String Actuation Mechanism and Tiny Tension Sensors", IEEE Robotics and Automation Letters, Jul. 2017, pp. 1571-1578, vol. 2, No. 3.

(Continued)

*Primary Examiner* — Paul T Chin
(74) *Attorney, Agent, or Firm* — Rabin & Berdo, P.C.

(57) ABSTRACT

Embodiments relate to a wearable robot hand device removable from a hand structure, including: at least one of first and second exglove modules as one or more exglove modules attached to the hand structure, the first exglove module being attached to a surface of the hand structure and the second exglove module being attached onto a exglove of the first exglove module.

12 Claims, 14 Drawing Sheets

(56) References Cited

U.S. PATENT DOCUMENTS

2018/0345481 A1* 12/2018 Cho ................... B25J 9/104
2020/0110465 A1*  4/2020 Ma .................... G06F 3/016
2020/0324402 A1* 10/2020 Roh ................... A61F 2/68

FOREIGN PATENT DOCUMENTS

| KR | 1020180107353 A | 10/2018 |
| KR | 1020190081891 A | 7/2019 |
| KR | 101981425 B1 | 8/2019 |
| KR | 102093555 B1 | 3/2020 |
| WO | 2012018159 A1 | 2/2012 |

OTHER PUBLICATIONS

Dong-Hyuk Lee et al., "KITECH-Hand: A Highly Dexterous and Modularized Robotic Hand", IEEE/ASME Transactions on Mechatronics, Apr. 2017, pp. 876-887, vol. 22, No. 2.

Zhe Xu et al., "Design of a Highly Biomimetic Anthropomorphic Robotic Hand towards Artificial Limb Regeneration", 2016 IEEE International Conference on Robotics and Automation (ICRA), May 16-21, 2016, Stockholm, Sweden, pp. 3485-3492.

Taylor D. Niehues et al., "Development and Validation of Modeling Framework for Interconnected Tendon Networks in Robotic and Human Fingers", 2017 IEEE International Conference on Robotics and Automation (ICRA), May 29-Jun. 3, 2017, Singapore, pp. 4181-4186.

* cited by examiner

< FLEXION >

< EXTENSION >

< Front >

- - - - -▶ FLEXION/EXTENSION OF PALM REGION OF THUMB
———▶ ADDUCTION/ABDUCTION OF THUMB
– – – –▶ FLEXION/EXTENSION OF INDEX FINGER MCP

< Rear >

- - - - -> FLEXION/EXTENSION OF PALM REGION OF THUMB

———> ADDUCTION/ABDUCTION OF THUMB

— - — -> FLEXION/EXTENSION OF INDEX FINGER MCP

< Front >

< Rear >

WEARABLE ROBOT HAND DEVICE REMOVABLE FROM HAND STRUCTURE

CROSS-REFERENCE TO RELATED APPLICATION

This application claims priority to Korean Patent Application No. 10-2020-0114427, filed on Sep. 8, 2020, and all the benefits accruing therefrom under 35 U.S.C. § 119, the contents of which in its entirety are herein incorporated by reference.

TECHNICAL FIELD

Embodiments relate to a robot hand device that implements a hand motion such as a finger pose and, more specifically, to a wearable robot hand device that is removable from a hand structure such as a human hand or a robot hand and accurately implements various hand motions by an actuator module on an outer surface.

BACKGROUND ART

In recent years, there has been continuous research on a hand robot that imitates a human hand.

The robot hand is configured to implement the motions of a palm and a back of a hand and fingers of a person. In general, the robot hand includes a plurality of joints rotatable about their axes inside the robot hand and is configured to perform flexion/extension function and/or adduction/abduction function by the rotation based on the joint provided therein.

The conventional robot hand is configured to drive the robot hand itself by controlling a skeleton structure inside the robot hand. However, it is quite difficult to manufacture the robot hand capable of controlling the internal skeleton. This is because the control system becomes complicated depending on the type and the internal structure of the robot hand structure.

In particular, since the robot hand which is driven by itself and is anthropomorphized as a rigid structure has low adaptability to an application or has low expandability in terms of an application that can be applied if the production is once completed, there is a limitation of low utilization.

DISCLOSURE

Technical Problem

The present disclosure can provide a wearable robot hand device having high adaptability and expandability by being removable from a hand-shaped structure in order to solve the limitations of the conventional robot hand.

The problems of the present disclosure are not limited to those mentioned above and other problems not mentioned here will be clearly understood by those skilled in the art from the following description.

A wearable robot hand device removable from a hand structure according to an aspect of the present disclosure includes: at least one of first and second exglove modules as one or more exglove modules attached to the hand structure, the first exglove module being attached to a surface of the hand structure and the second exglove module being attached onto a exglove of the first exglove module. The exglove module includes: a exglove covering a part or all of the hand structure; a plurality of wires disposed on front and rear surfaces of the hand structure; a plurality of fixation portions fixing the plurality of wires; and a plurality of actuator modules controlling tension of the plurality of wires.

In one embodiment, the first exglove module may include: a first exglove covering a palm region of the hand structure and at least a part of fingers; one or more pairs of first wires disposed on the first exglove on the front and rear surfaces of the hand structure; and one or more first actuator modules connected to the one or more pairs of first wires. Here, the one or more pairs of first wires may include one or more of a pair of 1-1 wires and a pair of 1-2 wires, the 1-1 wire may allow the flexion of the palm region near a thumb toward a palm of the hand or the extension of the palm region toward a back of the hand, and the 1-2 wire may allow the adduction or abduction of the thumb.

In one embodiment, the one or more pairs of first wires may further include a pair of 1-3 wires. The pair of 1-3 wires may allow the flexion of one knuckle of a finger toward the palm of the hand or the extension thereof toward the back of the hand.

In one embodiment, a 1-1 actuator module connected to the pair of 1-1 wires or a 1-3 actuator module connected to the pair of 1-3 wires may include a motor and first and second rotation bodies rotated by the motor, a front wire may be connected to the first rotation body, and a rear wire may be connected to the second rotation body. The front wire and the rear wire may be connected to the first and second rotation bodies so that the tension of the front wire increases and the tension of the rear wire decreases by the rotation of the 1-1 or 1-3 actuator module in one direction or the tension of the front wire decreases and the tension of the rear wire increases by the rotation of the 1-1 or 1-3 actuator module in the other direction.

In one embodiment, the first rotation body and the second rotation body may rotate in the same direction by the motor and the front wire and the rear wire may be connected to each other while being wound in different directions.

In one embodiment, the 1-2 actuator module connected to the pair of 1-2 wires may include a motor and first and second rotation bodies rotated by the motor, and a front wire and a rear wire may be connected to the first and second rotation bodies so that the adduction of the thumb toward a fingertip is allowed when the tension of the front wire or the rear wire increases.

In one embodiment, the second exglove module may include: a second exglove covering the finger; one or more pairs of second wires disposed on the second exglove on the front and rear surfaces of the hand structure; and one or more second actuator modules connected to the one or more pairs of second wires. Further, the one or more pairs of second wires may include one or more pairs of 2-1 to 2-5 wires. Furthermore, the pair of 2-1 wires may be disposed on a thumb, the pair of 2-2 wires may be disposed on an index finger, the pair of 2-3 wires may be disposed on a middle finger, the pair of 2-4 wires may be disposed on a ring finger, and the pair of 2-5 wires may be disposed on a little finger.

In one embodiment, when the second actuator module includes a motor and first and second rotation bodies rotated by the motor, a front wire may be connected to the first rotation body and a rear wire may be connected to the second rotation body in the second wire.

In one embodiment, when the second actuator module includes a motor and a rotation body rotated by the motor, the second exglove module may include a pair of second actuator modules controlling the flexion or extension of the finger, and a front wire and a rear wire in the second wire may be respectively connected to the pair of second actuator modules.

In one embodiment, the pair of second actuator modules may be driven so that the tension of the front wire increases or the tension of the rear wire decreases in the pair of second wires in order to allow the flexion of the finger toward a palm of the hand and the tension of the front wire decreases or the tension of the rear wire increases in the pair of second wires in order to allow the extension of the finger toward a back of the hand.

In one embodiment, when the first exglove module and the second exglove module are attached to the hand structure, the extension of a lower knuckle of the finger toward a back of a hand may be allowed by the first exglove module and the flexion of an upper knuckle or a middle knuckle of the finger toward a palm of the hand may be allowed by the second exglove module.

In one embodiment, the wearable robot hand device further may include one or more sensors measuring a flexion angle of a flexion portion in the hand structure. Here, a drive signal of the actuator module may be based on a relationship between the flexion angle and a detection result of the sensor.

The wearable robot hand device according to embodiments of the present disclosure is attached to a robot hand implemented as a hand-shaped rigid structure or a real human hand and is driven to imitate a finger pose of a person.

The wearable robot hand device may be attached to various robot hands or a real human hand and has high expandability. Furthermore, the wearable robot hand device may easily add and remove the actuator module and has high adaptability.

Furthermore, the robot hand device may implement various hand motions by having a dual-layer module that implements the motions of intrinsic and extrinsic muscles of a human hand and.

The effects that can be obtained in the present disclosure are not limited to the above-mentioned effects and other effects not mentioned above will be clearly understood by those having ordinary skill in the art from the following description.

BEST MODE

Figure 1:
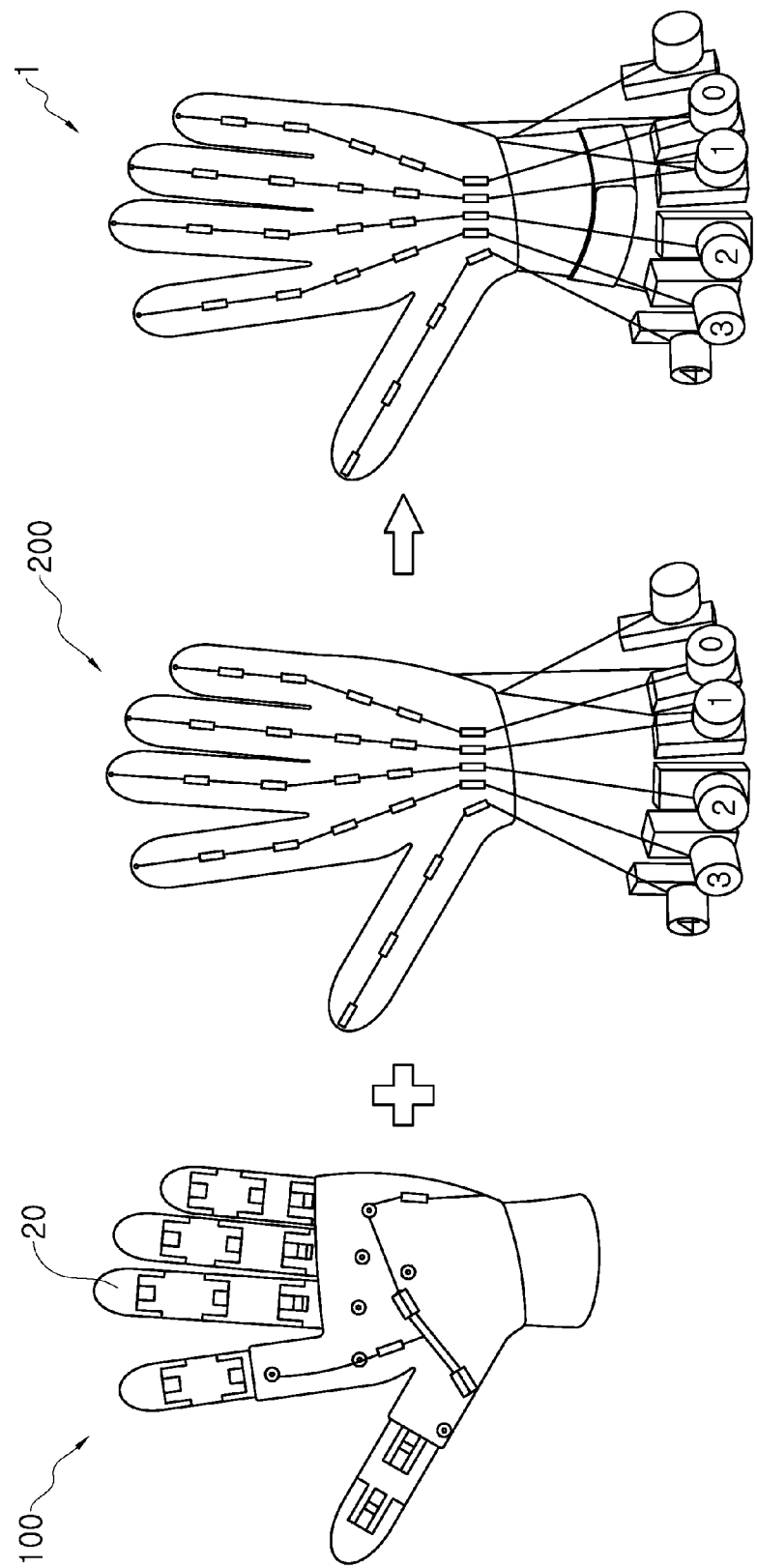
FIG. 1 is a schematic view of a robot hand device according to one embodiment of the present disclosure.

Hereinafter, a tactile stimulus generating apparatus/system according to a preferred embodiment of the present disclosure will be described with reference to the accompanying drawings. The present disclosure will be described with reference to the embodiment shown in the drawings. However, since the present disclosure is described as one embodiment, the technical idea of the present disclosure and the essential configuration and operation thereof are not limited.

FIG. 1 is a schematic view of a wearable robot hand device according to one embodiment of the present disclosure.

Referring to FIG. 1, a wearable robot hand device 1 includes a exglove module which is attachable to and detachable from a hand structure 20. The exglove module includes a exglove which covers a hand structure 20; a plurality of wires which correspond to tendons; a fixation portion which fixes the plurality of wires; and an actuator module which controls the tension of the plurality of wires.

Figure 2:
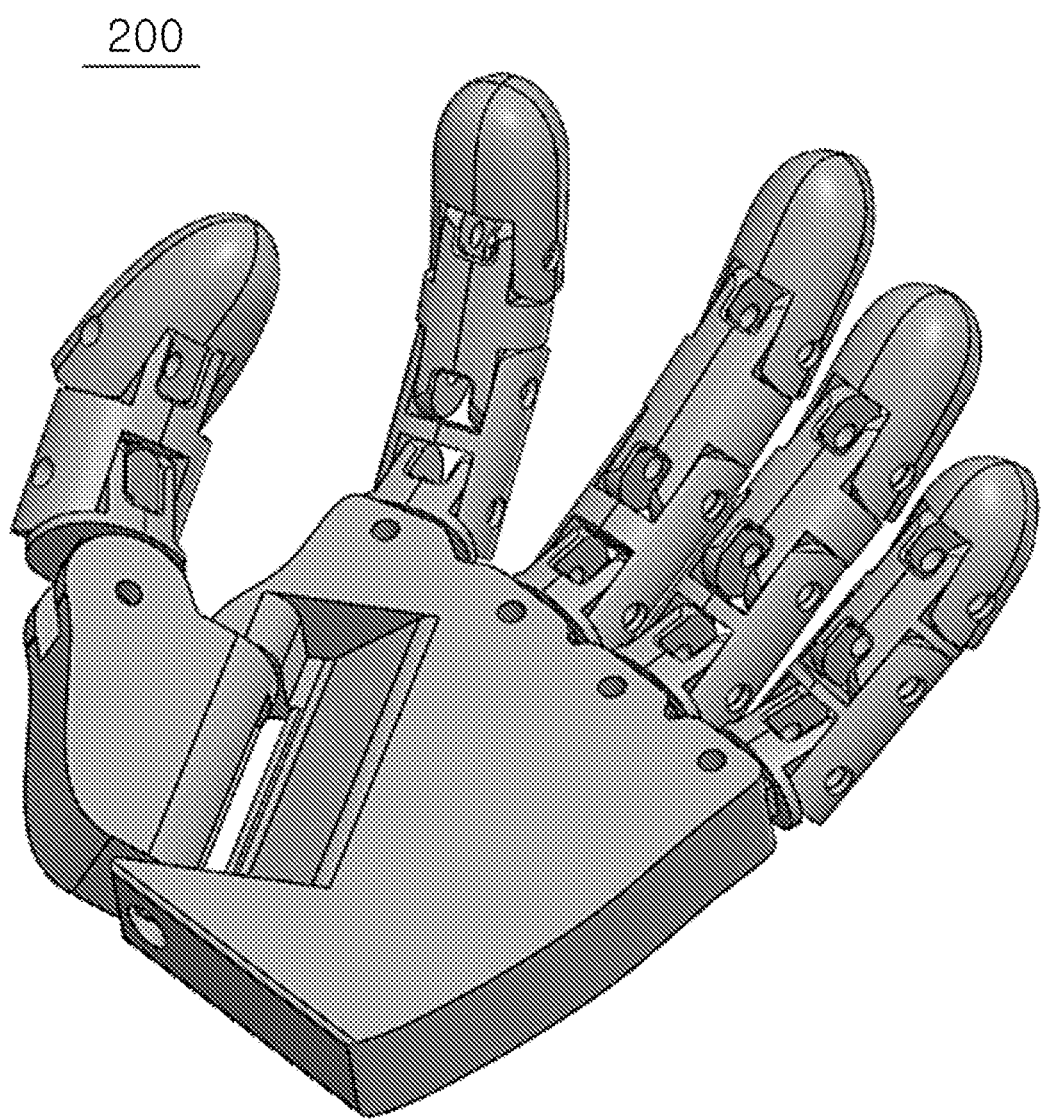
FIG. 2 is a perspective view of a robot hand structure to which the robot hand device according to one embodiment of the present disclosure is attachable.

FIG. 2 is a perspective view of a robot hand structure to which the robot hand device according to one embodiment of the present disclosure is attachable.

Referring to FIG. 2, the structure to which the wearable robot hand device 1 is attached may be a hand-shaped structure which constitutes the robot hand. The hand-shaped structure may be a rigid structure that has rigidity for supporting the exglove.

The rigid structure is configured to independently move five fingers. Furthermore, the rigid structure is configured to imitate the function of the human hand motion. For example, the rigid structure may include five fingers and a thumb part of the five fingers may include an IP-joint (interphalangeal joint), an MP-joint (metacarpophalangeal joint), a CMC joint (carpometacarpal joint), and a skeleton and/or a knuckle connecting these joints. Among the five fingers, an index finger, a middle finger, a ring finger, and a little finger part may include a DIP joint (distal interphalangeal joint), a PIP joint (proximal interphalangeal joint), an MCP joint (metacarpophalangeal joint), and a skeleton and/or a knuckle connecting these joints. Each finger structure is configured to perform a flexion or extension operation based on a rotation axis.

However, it is apparent to those skilled in the art that the hand-shaped robot hand to which the wearable robot hand device 1 is attached is not limited. In another embodiment, the wearable robot hand device 1 may be attached to a real human hand. In this case, even when the human hand does not move the wearable robot hand device 1, the human hand may be moved by the wearable robot hand device 1. As a result, the wearable robot hand device 1 may be used as a rehabilitation device or an auxiliary device for a person with discomfort in hands.

The exglove covers a part or all of the hand structure 20 and has a wearable shape to be attachable to and detachable from the hand structure 20.

In one embodiment, the exglove attached to the hand structure 20 may have various glove shapes. For example, the exglove may have a full glove shape in which all fingers are not exposed or a half glove shape in which at least some of the fingers are exposed.

In specific embodiments, a first exglove module 100 and a second exglove module 200 may have different exgloves. For example, the exglove of the first exglove module 100 is configured to cover a palm region and a part or all of fingers as shown in FIG. 1. Here, the palm region includes a lower knuckle, that is, a lower portion of the CMC joint between the fingers. In contrast, the exglove of the second exglove module 200 may have a full glove shape as shown in FIG. 1.

Furthermore, the exglove glove may include several pieces of insulated glove coated with a nitrile foam surface. Then, the exglove glove has a strong and elastic surface.

A plurality of wires are disposed on the exglove. The plurality of wires are disposed on the finger and/or the palm and are used as means for moving the finger or the palm where the wires are disposed. The wires have functions of human tendons.

The plurality of wires are coupled to each other by a plurality of fixation portions provided on the exglove. The fixation portion includes a first type of fixation portion which hangs the wire; and/or a second type of fixation portion which allows the wire to be movable in the extension direction.

The first type of fixation portion may have, for example, a protruding structure. In contrast, the second type of fixation portion may be, for example, a tube having a through-hole. Then, the wire is coupled to pass through the tube. However, the first type and second type of fixation portions are not limited to those shapes.

An actuator module is connected to the wire and is configured to apply tension to the wire or eliminate the tension therefrom.

Figure 3:
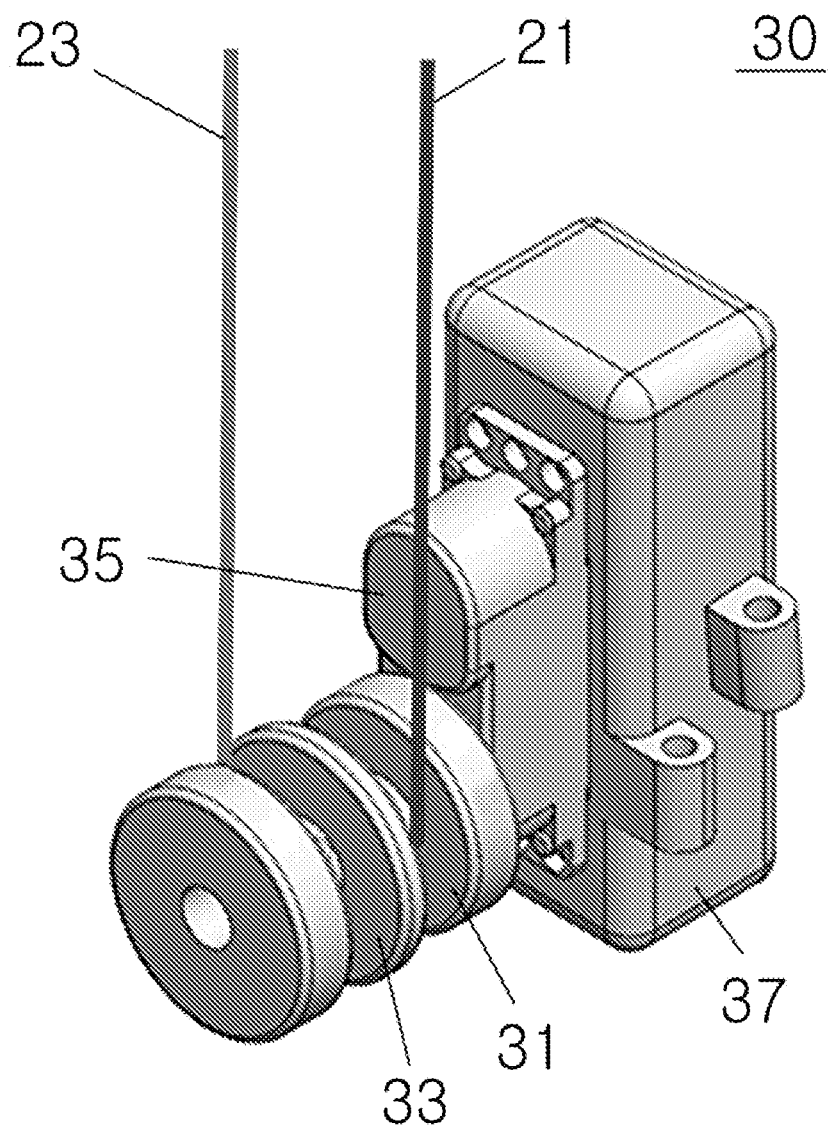
FIG. 3 is a schematic view of an actuator module of the robot hand device according to one embodiment of the present disclosure.
Figure 4A:
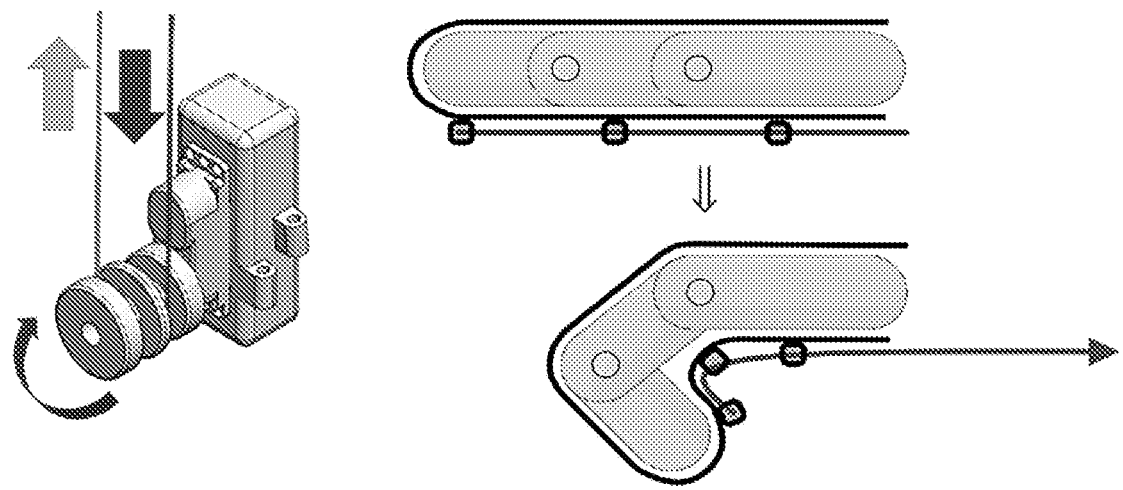
FIGS. 4A and 4B are diagrams illustrating an operation of the actuator module of FIG. 3.
Figure 4B:
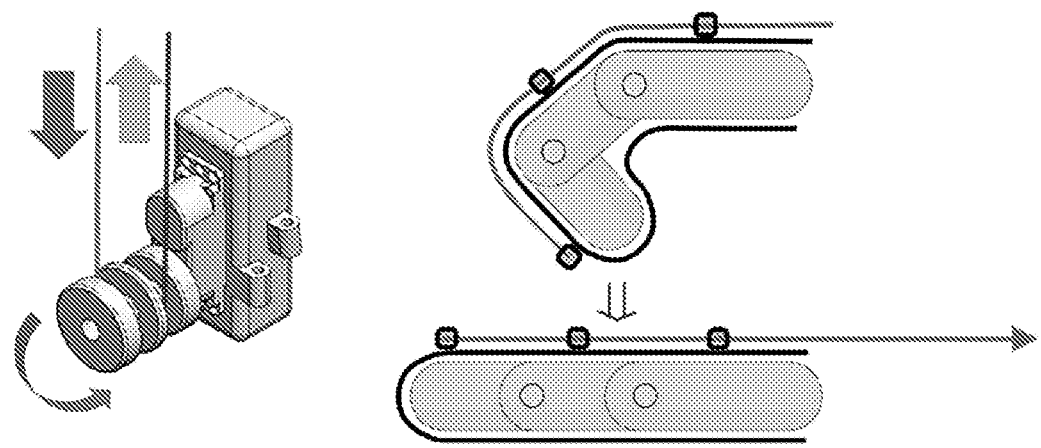

FIG. 3 is a schematic view of the actuator module of the robot hand device according to one embodiment of the present disclosure and FIGS. 4A and 4B are diagrams illustrating the operation of the actuator module of FIG. 3. FIG. 4A is a diagram showing a flexion operation that is implemented by the actuator module of FIG. 3 and FIG. 4B is a diagram showing an extension operation that is implemented by the actuator module of FIG. 3.

Referring to FIG. 3, an actuator module 30 includes a first rotation body 31 on which a front wire 21 is wound; a second rotation body 33 on which a rear wire 23 is wound; and a motor 35 which rotates the first rotation body 31 or the second rotation body 33. In some embodiments, the actuator module 30 further includes a motor holder 37 which is connected to another actuator module 30. Since it is easy to increase the number of the actuator modules 30 through the motor holder 37, it is possible to increase the degree of freedom in the finger motion. The motor holder 37 may have a hinge structure, for example, as shown in FIG. 3, but is not limited thereto.

The front wire 21 is a wire which is disposed on the front surface of the hand (that is, the palm of the hand). The rear wire 23 is a wire which is disposed on the rear surface of the hand (that is, the back of the hand). The first rotation body 31 and the second rotation body 33 are configured to wind or release the wire. For example, the first rotation body 31 and the second rotation body 33 may have a pulley shape, but is not limited thereto.

When the first rotation body 31 winds the front wire 21, tension is applied to the front wire 21. Then, as shown in FIG. 4A, the finger part (or palm part) to which the front wire 21 is attached is bent (flexion).

Furthermore, when the first rotation body 31 releases the front wire 21, the tension on the front wire 21 is eliminated and the front wire 21 is loosened. Then, the finger part (or palm part) to which the front wire 21 is extensible (extension)

When the first rotation body 31 is released from the wound state, the finger part (or palm part) in a flexion state may be unfolded again due to the extension.

In contrast, when the second rotation body 33 winds the rear wire 23, tension is applied to the rear wire 23. Then, as shown in FIG. 4B, the finger part (or palm part) to which the rear wire 23 is extensible (extension).

Furthermore, when the second rotation body 33 releases the rear wire 23, the tension on the rear wire 23 is eliminated and the rear wire 23 is loosened. Then, the finger part (or palm part) to which the rear wire 23 is attached is bent (flexion).

In one embodiment, the front wire 21 may be disconnected from the rear wire 23.

In another embodiment, the front wire 21 and the rear wire 23 may be connected to each other and may configure a single wire. In this case, the front wire 21 indicates a portion disposed on the front surface of the hand in a single wire and the rear wire 23 indicates a portion disposed on the rear surface of the hand in the single wire.

The motor 35 is driven to rotate the first rotation body 31 and the second rotation body 33. The front wire 21 wound on the first rotation body 31 may be released by the rotation of the motor 35. The rear wire 23 wound on the second rotation body 33 may be released by the rotation of the motor 35.

The actuator module 30 may control the tension of the front wire 21 and the rear wire 23 through the rotation direction of the first rotation body 31 and/or the second rotation body 33.

In one embodiment, the actuator module 30 may be configured to rotate the first rotation body 31 and the second rotation body 33 in the same direction by the motor 35. Here, the front wire 21 and the rear wire 23 are connected to the first rotation body 31 and the second rotation body 33 in mutually different directions. In the case of the single motor, the rotation bodies 31, 33 rotate in a synchronization manner.

For example, guess a case that the front wire 21 and the rear wire 23 are respectively wound in the counter-clockwise direction and the clockwise direction. When the first rotation body 31 and the second rotation body 33 rotate in the clockwise direction by the motor 35, tension occurs in the front wire 21, but the rear wire 23 is loosened. On the other hand, when the first rotation body 31 and the second rotation body 33 rotate in the counter-clockwise direction by the motor 35, the front wire 21 is loosened and tension occurs in the rear wire 23.

In another embodiment, the actuator module 30 may be configured to rotate the first rotation body 31 and the second rotation body 33 in mutually opposite directions by the motor 35. Here, the front wire 21 and the rear wire 23 are connected to the first rotation body 31 and the second rotation body 33 in the same direction. In the case of the single motor, the rotation bodies 31, 33 rotate in a synchronization manner.

The wearable robot hand device 1 includes a plurality of actuator modules 30. The plurality of actuator modules 30 may include one or more motors 35. For example, a part of the plurality of actuator modules 30 may include a plurality of motors 35. Other parts of the plurality of actuator modules 30 may include a single motor 35. In this case, the plurality of motors 35 may generate a stronger tension compared to the single motor 35.

Since the wearable robot hand device 1 implements the finger pose by using the tendon installed on the outside, there is no limitation on the torque unlike the conventional robot hand having the actuator inside the palm or the finger and hence the performance of a manipulator (not shown) controlling the actuator does not deteriorate.

In one embodiment, the wearable robot hand device 1 may include one or more exglove module. The one or more exglove module may include the first exglove module 100 corresponding to the intrinsic muscle of the human hand and/or the second exglove module 200 corresponding to the extrinsic muscle of the human hand.

Hereinafter, the exglove module corresponding to the intrinsic muscle will be referred to as the first exglove module 100 and will be described in more detail with reference to FIG. 5 and the like and the exglove module corresponding to the extrinsic muscle will be referred to as the second exglove module 200 and will be described in more detail with reference to FIG. 9 and the like.

Furthermore, the actuator modules 30 shown in FIG. 3 and included in the first exglove module 100 and the second exglove module 200 will be described as a first actuator module 130 and a second actuator module 230 in order to distinguish them from each other.

Figure 5A:
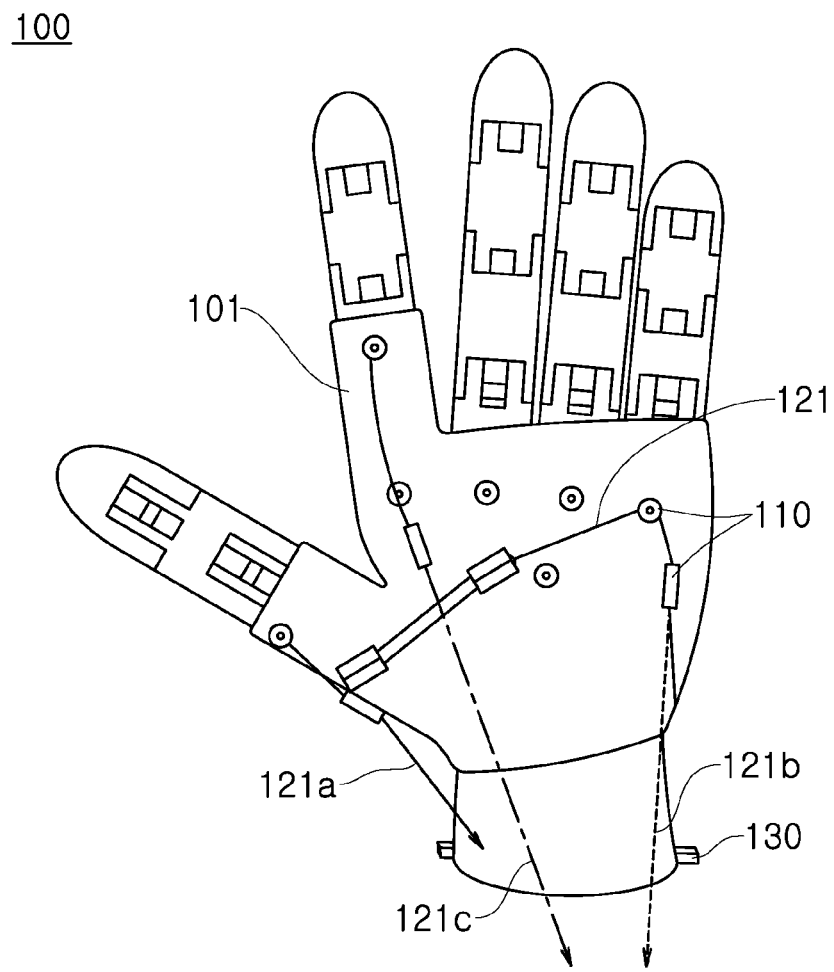
FIGS. 5A and 5B are front and rear views of a first exglove module corresponding to an intrinsic muscle according to one embodiment of the present disclosure.
Figure 5B:
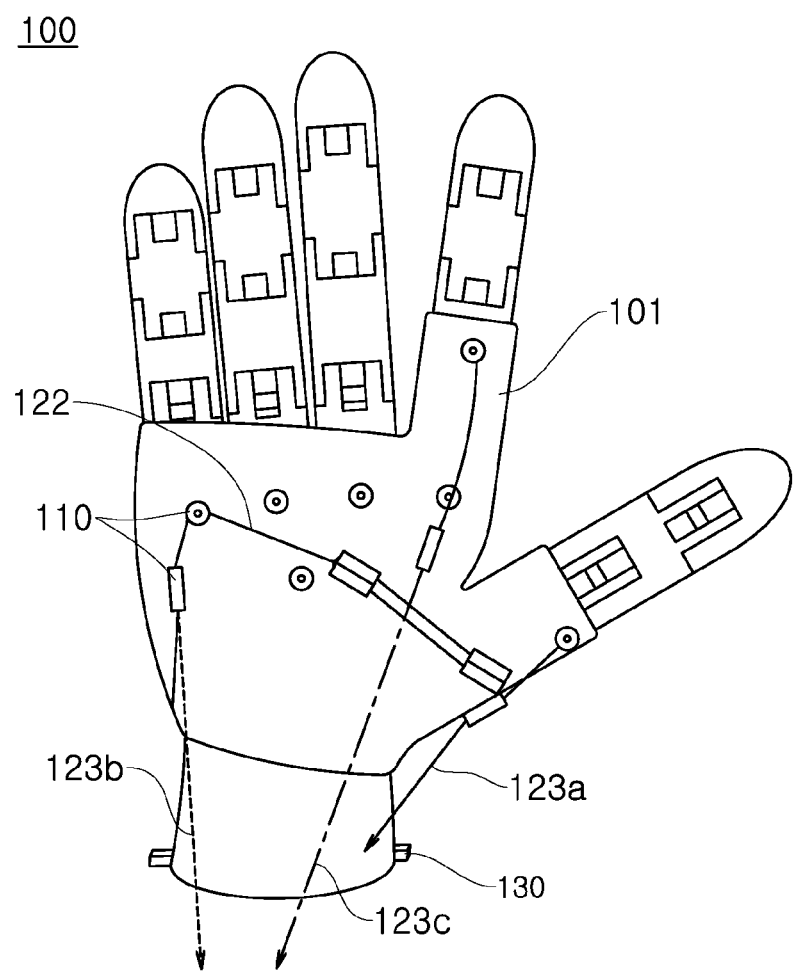

FIGS. 5A and 5B are front and rear views of the first exglove module corresponding to the intrinsic muscle according to one embodiment of the present disclosure.

Referring to FIGS. 5A and 5B, the first exglove module 100 includes a first exglove 101. The first exglove 101 is configured to cover a palm region and a part or all of fingers. A part of the finger includes a lower knuckle of the finger. For example, as shown in FIGS. 5A and 5B, the first exglove 101 may be configured to cover a lower knuckle of the index finger.

Furthermore, the first exglove module 100 includes one or more pairs of first wires 121, 123 which are respectively disposed on the front and rear surfaces; and one or more first actuator modules 130 which are connected to the one or more pairs of first wires 121, 123. The one or more pairs of first wires are disposed on the first exglove 101. The first exglove module 100 includes a plurality of first fixation portions 110 which fix the pair of first wires 121, 123.

The pair of first wires 121, 123 is used to control the same part, one of the pair of first wires 121, 123 is disposed on the front surface, and the other is disposed on the rear surface. That is, the pair of first wires 121, 123 includes a first front wire 121 and a first rear wire 123 for the same part.

In one embodiment, the one or more pairs of first wires of the first exglove module 100 may include one or more of a pair of 1-1 wires and a pair of 1-2 wires. The 1-1 wire allows the flexion of the palm region near the thumb toward the palm of the hand or the extension of the palm region toward the back of the hand and the 1-2 wire allows the adduction/abduction of the thumb. When the first exglove module 100 includes the pair of 1-1 wires, the first exglove module includes a 1-1 actuator module 130a connected to the pair of 1-1 wires. When the first exglove module 100 includes the pair of 1-2 wires, the first exglove module includes a 1-2 actuator module 130b connected to the pair of 1-2 wires.

One ends of the pair of 1-1 wires 121a, 123a are connected to the 1-1 actuator module 130a located at the wrist. Then, the other ends of the pair of 1-1 wires 121a, 123a are fixed by the first fixation portion 110 (or referred to as the end fixation portion) installed on one end side surface of the palm near the thumb.

The first fixation portion 110 fixing the 1-1 wire 121a, 123a is located above the joint connecting the thumb and the palm, that is, the CMC joint. For example, the first fixation portion 110 fixing the 1-1 wire 121a, 123a may be installed between the CMC joint and the MCP joint of the thumb as shown in FIGS. 5A and 5B.

In one embodiment, the pair of 1-1 wires 121a, 123a may be extended from the 1-1 actuator module 130a of the wrist to the first fixation portion 110 installed on one side surface of the palm near the thumb through another first fixation portion 110 installed on one side surface of the palm near the little finger. The another first fixation portion 110 is a middle fixation portion and is installed at a position that facilitates the flexion of the thumb part compared to the case where the first fixation portion directly extends from the wrist to the end fixation portion. Here, the ease of flexion means more accurate imitation of the motion of the human hand with less torque.

The positions of other first fixation portions 110 may be arbitrary points on one side surface of the palm near the little finger. In some embodiments, the position may be determined by the flexion direction of the thumb part of the hand structure 20 toward the palm of the hand. For example, the middle fixation portion may be located on an arbitrary section along the folding direction of the muscle structure of the MCP joint.

The 1-1 actuator module 130a may control the tension of the 1-1 front wire 121a and/or the tension of the 1-1 rear wire 123a through the rotation direction of the first rotation body 131a and/or the second rotation body 133a. Then, the flexion of the palm region near the thumb in the hand structure 20 toward the palm of the hand (generally referred to as a grab direction) or the extension thereof toward the back of the hand is allowed.

Figure 6:
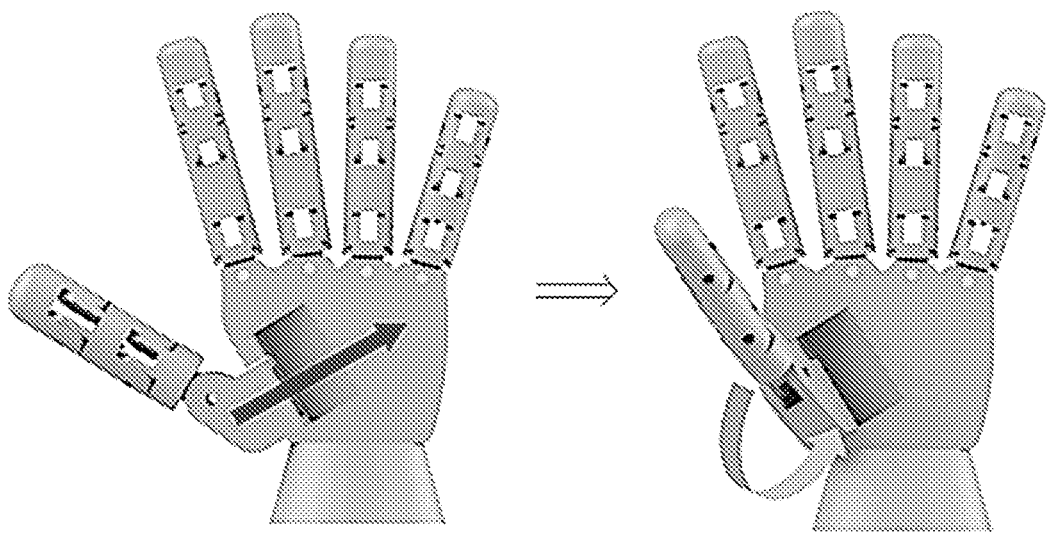
FIG. 6 is a diagram illustrating a flexion/extension operation of a palm region connected to a thumb by the first exglove module of FIG. 5.

FIG. 6 is a diagram illustrating the flexion/extension operation of the palm region connected to the thumb by the first exglove module of FIG. 5.

When the 1-1 actuator module 130a winds the 1-1 front wire 121a connected to the first rotation body 131a, the strength of the tension of the 1-1 front wire 121a increases. When the 1-1 actuator module 130a releases the 1-1 rear wire 123a connected to the second rotation body 133a, the strength of the tension of the 1-1 rear wire 123a decreases.

When the tension of the 1-1 front wire 121a increases and/or the tension of the 1-1 rear wire 123a decreases, the flexion of a part or all of the thumb part toward the palm of the hand is allowed. For example, the flexion of a part or all of the thumb part toward the palm of the hand is allowed as the tension of the 1-1 front wire 121a increases as shown in FIG. 6.

When the 1-1 actuator module 130a releases the 1-1 front wire 121a connected to the first rotation body 131a, the strength of the tension of the 1-1 front wire 121a decreases. When the 1-1 actuator module 130a winds the 1-1 rear wire 123a connected to the second rotation body 133a, the strength of the tension of the 1-1 rear wire 123a increases.

When the tension of the 1-1 front wire 121a decreases and/or the tension of the 1-1 rear wire 123a increases, a part or all of the thumb part toward the back of the hand is extensible.

In one embodiment, the 1-1 front wire 121a and the 1-1 rear wire 123a may be connected to the 1-1 actuator module 130a so that the tension of the 1-1 front wire 121a increases and the tension of the 1-1 rear wire 123a decreases by the rotation of the 1-1 actuator module 130a in one direction or the tension of the 1-1 front wire 121a decreases and the tension of the 1-1 rear wire 123a increases by the rotation of the 1-1 actuator module 130a in the other direction.

In some embodiments, the 1-1 front wire 121a and the 1-1 rear wire 123a may be connected to the first rotation body 131a and the second rotation body 133a in mutually different directions. Here, the first rotation body 131a and the second rotation body 133a rotate in the same direction.

For example, guess a case that the 1-1 front wire 121a and the 1-1 rear wire 123a are respectively wound in the counter-clockwise direction and the clockwise direction.

When the first rotation body 131a and the second rotation body 133a rotate in the clockwise direction by the motor 136a, tension occurs in the 1-1 front wire 121a, but the 1-1 rear wire 123a is loosened. Then, a part or all of the thumb part toward the palm of the hand is flexible.

On the other hand, when the first rotation body 131a rotates in the counter-clockwise direction by the motor 136a, tension occurs in the 1-1 rear wire 123a, but the 1-1 front wire 121a is loosened. Then, the extension of a part or all of the thumb part toward the back of the hand is allowed.

In this way, the flexion or extension of the same part may be controlled by the single actuator module 130 through the rotation directions of the first and second rotation bodies 31, 33.

In one embodiment, the first exglove module 100 may include a pair of 1-2 wires 121b, 123b allowing the adduction of the thumb toward the wrist or the abduction of the thumb toward the fingertip and a 1-2 actuator module 130b connected to the pair of 1-2 wires 121b, 123b.

One ends of the pair of 1-2 wires 121b, 123b are connected to the 1-2 actuator module 130b located at the wrist. Then, the other ends of the pair of 1-2 wires 121b, 123b are fixed by the first fixation portion 110 provided in the index finger region of the first exglove 101.

The first fixation portion 110 fixing the 1-2 wire 121b, 123b is located above the joint connecting the index finger and the palm, that is, the CMC joint. For example, the first fixation portion 110 fixing the 1-2 wire 121b, 123b may be installed between the CMC joint and the MCP joint of the thumb as shown in FIGS. 5A and 5B.

The 1-2 actuator module 130b may control the tension of the 1-2 front wire 121b and/or the tension of the 1-2 rear wire 123b through the rotation direction of the first rotation body 131b and/or the second rotation body 133b.

Figure 7:
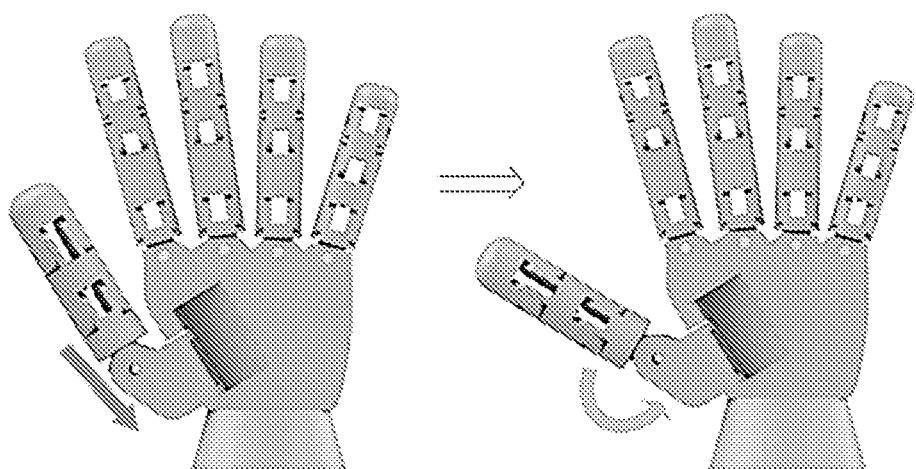
FIG. 7 is a diagram illustrating an adduction/abduction operation of the thumb by the first exglove module of FIG. 5.

FIG. 7 is a diagram illustrating the adduction/abduction operation of the thumb by the first exglove module of FIG. 5.

When the 1-2 actuator module 130b winds the 1-2 front wire 121b connected to the first rotation body 131b, the strength of the tension of the 1-2 front wire 121b increases. When the 1-2 actuator module 130b winds the 1-2 rear wire 123b connected to the second rotation body 133b, the strength of the tension of the 1-2 rear wire 123b increases.

When the tension of the 1-2 front wire 121b and/or the 1-2 rear wire 123b increases, the abduction of the thumb toward the fingertip is allowed. For example, as shown in FIG. 7, the abduction of the thumb toward the fingertip is allowed as the tension of the 1-2 front wire 121b increases.

When the 1-2 actuator module 130b releases the 1-2 front wire 121b connected to the first rotation body 131b, the strength of the tension of the 1-2 front wire 121b decreases. When the 1-2 actuator module 130b releases the 1-2 rear wire 123b connected to the second rotation body 133b, the strength of the tension of the 1-2 rear wire 123b decreases.

When the tension of the 1-2 front wire 121b and/or the 1-2 rear wire 123b decreases, the abduction of a part or all of the thumb part is allowed. For example, when the tension of a 1-2 rear wire 123b decreases, the abduction of the thumb toward the wrist is allowed.

In one embodiment, the first exglove module 100 may further include a pair of other wires. In this case, the first exglove module 100 further includes another first actuator module 130 connected to the pair of other wires.

The pair of other wires is used for the flexion or extension of the lower knuckle of the finger based on the joint. For example, as shown in FIGS. 5A and 5B, the first exglove module 100 may further include a pair of 1-3 wires 121c, 123c and a 1-3 actuator module 130c controlling the lower knuckle of the index finger.

Although it is shown that the first exglove module 100 includes one pair of other wires in FIGS. 5A and 5B, the first exglove module 100 is not limited thereto. In other embodiments, the first exglove module 100 may include a plurality of pairs of other wires and another first actuator module for the lower knuckles of two or more fingers among five fingers. Hereinafter, the first exglove module 100 based on the index finger of FIG. 5 will be described in more detail in order to clarify the description.

One ends of the pair of 1-3 wires 121c, 123c are connected to the 1-3 actuator module 130c located at the wrist. The other ends of the pair of 1-3 wires 121c, 123c extend to the lower knuckle of the index finger of the first exglove 101 and are fixed by the first fixation portion 110 installed at the exglove 101.

The first fixation portion 110 for fixing the 1-3 wire is located at the lower knuckle part of the finger. For example, as shown in FIGS. 5A and 5B, the first fixation portion 110 fixing the 1-3 wire may be installed between the MCP joint and the PIP joint of the index finger.

The 1-3 actuator module 130c may control the tension of a 1-3 front wire 121c and/or the tension of a 1-3 rear wire 123c through the rotation direction of a first rotation body 131c and/or a second rotation body 133c.

Figure 8:
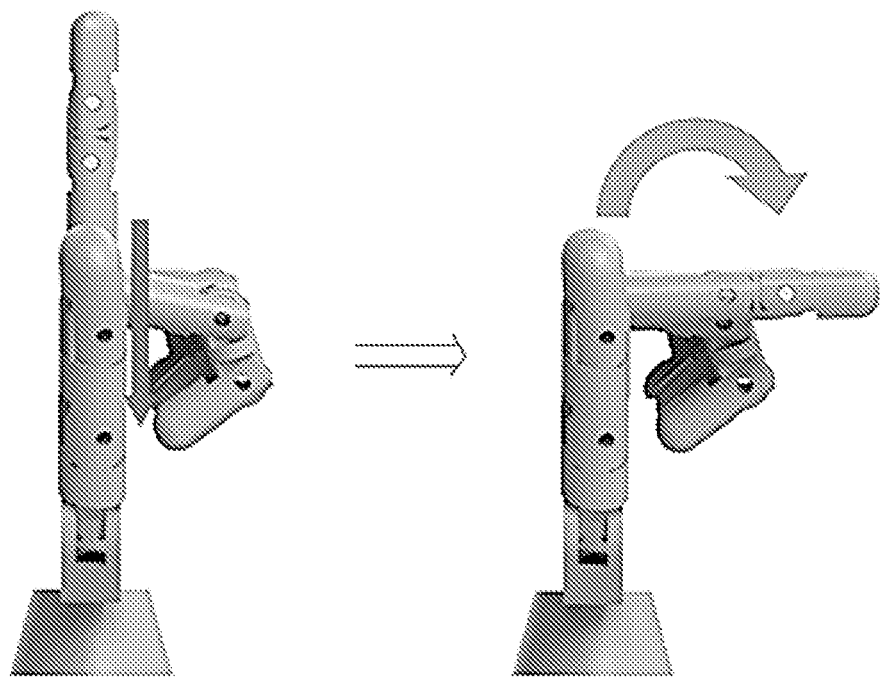
FIG. 8 is a diagram illustrating a flexion/extension operation of a lower knuckle of the finger by the first exglove module of FIG. 5.

FIG. 8 is a diagram illustrating a procedure of implementing the flexion/extension operation of the lower knuckle of the finger by the first exglove module of FIG. 5.

When the 1-3 actuator module 130c winds the 1-3 front wire 121c connected to the first rotation body 131c, the strength of the tension of the 1-3 front wire 121c increases. When the 1-3 actuator module 130c releases the 1-3 rear wire 123c connected to the second rotation body 133c, the strength of the tension of the 1-3 rear wire 123c decreases.

When the tension of the 1-3 front wire 121c increases and/or the tension of the 1-3 rear wire 123c decreases, the flexion of the lower knuckle of the finger toward the palm of the hand is allowed. For example, as shown in FIG. 8, the flexion of the lower knuckle of the index finger toward the palm of the hand is allowed as the tension of the 1-3 front wire 121c increases.

When the 1-3 actuator module 130c releases the 1-3 front wire 121c connected to the first rotation body 131c, the strength of the tension of the 1-3 front wire 121c decreases.

When the 1-3 actuator module 130c winds the 1-3 rear wire 123c connected to the second rotation body 133c, the strength of the tension of the 1-3 rear wire 123c increases.

When the tension of the 1-3 front wire 121c decreases and/or the tension of the 1-3 rear wire 123c increases, the extension of the lower knuckle of the finger toward the back of the hand is allowed. For example, when the tension of the 1-3 rear wire 123c increases, the extension of the lower knuckle of the index finger toward the back of the hand is allowed.

In one embodiment, the 1-3 front wire 121c and the 1-3 rear wire 123c may be connected to the 1-3 actuator module 130c so that the tension of the 1-3 front wire 121c increases and the tension of the 1-3 rear wire 123c decreases by the rotation of the 1-3 actuator module 130c in one direction or the tension of the 1-3 front wire 121c decreases and the tension of the 1-3 rear wire 123c increases by the rotation of the 1-3 actuator module 130c in the other direction.

Since the operation of controlling the tension by the 1-3 actuator module 130c through the rotation direction has been described above in detail with reference to the operation of the 1-1 actuator module 130a in FIG. 3, detailed description will be omitted.

In this way, the first exglove module 100 may implement the hand motion according to the intrinsic muscle when the first wire and the first actuator corresponding to the function of the intrinsic muscle of the human hand are provided and hence have high expandability.

Figure 9A:
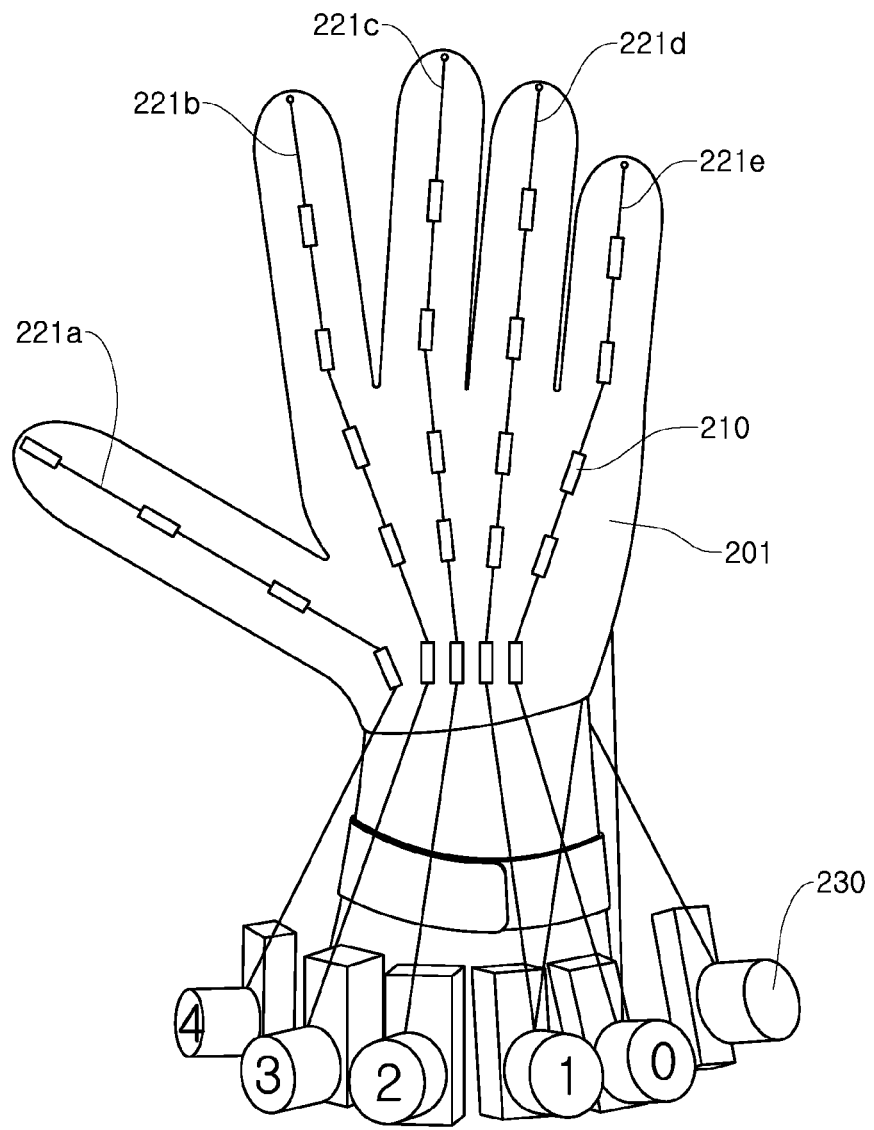
FIGS. 9A and 9B are front and rear views of a second exglove module corresponding to an extrinsic muscle according to one embodiment of the present disclosure.
Figure 9B:
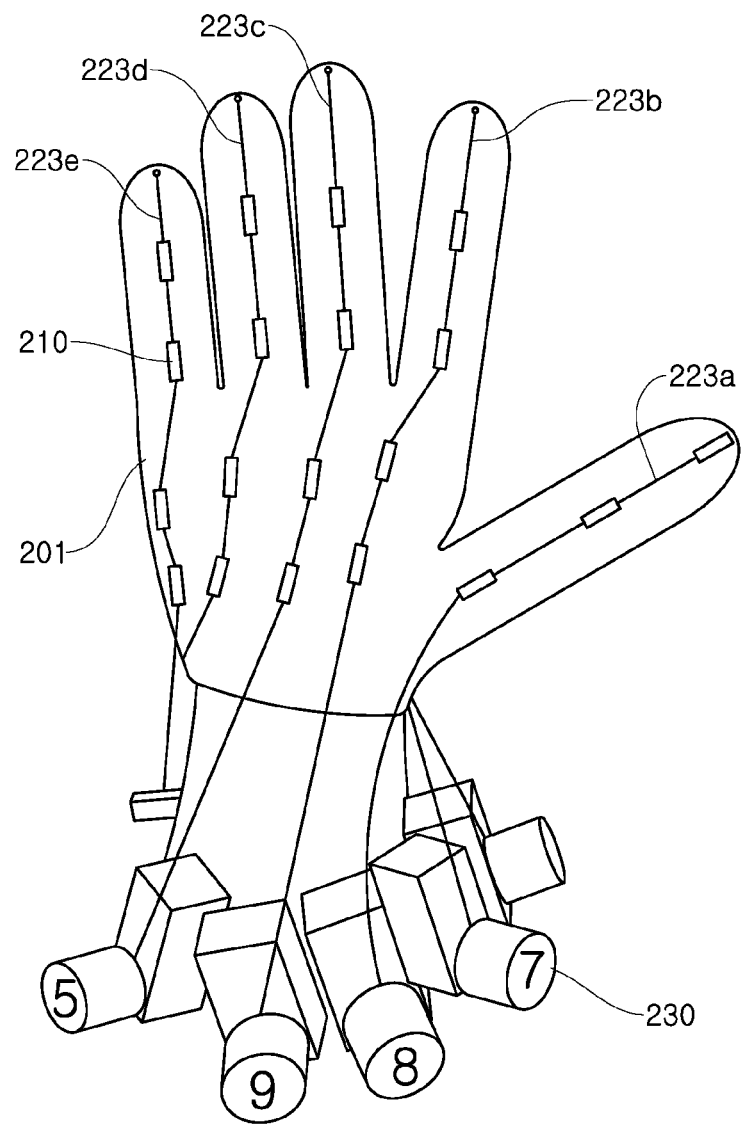

FIGS. 9A and 9B are front and rear views of the second exglove module corresponding to the extrinsic muscle according to one embodiment of the present disclosure.

Since the components and driving principles of the second exglove module 200 are similar to those of the first exglove module 100, the second exglove module 200 will be mainly described by focusing on the difference.

The second exglove module 200 includes a second exglove 201. The second exglove 201 is configured to cover the upper knuckle of the finger. Furthermore, the second exglove 201 may be configured to cover the upper knuckle of the finger and one or more of the palm, the middle knuckle, and the lower knuckle. For example, the second exglove 201 may have a glove shape as shown in FIG. 9.

Furthermore, the second exglove module 200 includes one or more pairs of second wires 221, 223 disposed on the second exglove 201 on the front and rear surfaces of the hand structure; and one or more second actuator modules 230 connected to the one or more pairs of second wires.

The one or more second actuator modules 230 are coupled to be located at the wrist part. The one or more pairs of second wires 221, 223 are fixed by a plurality of second fixation portions 210 provided on the second exglove 201.

The one or more pairs of second wires of the second exglove module 200 may include one or more pairs of 2-1 to 2-5 wires. For example, the second exglove module 200 may include: a pair of 2-1 wires 221a, 223a disposed on the thumb, a pair of 2-2 wires 221b, 223b disposed on the index finger, a pair of 2-3 wires 221c, 223c disposed on the middle finger, a pair of 2-4 wires 221d, 223d disposed on the ring finger, and a pair of 2-5 wires 221e, 223e disposed on the little finger. Each of the pairs of 2-1 to 2-5 wires 221a to 221e, 223a to 223e is connected to the second actuator module 230a to 230e.

One ends of the pair of second wires are connected to the second actuator module 230. Then, the other ends of the pair of second wires are extended to the upper knuckle of the finger. The other end of the second wire is fixed by the second fixation portion 210 installed in the upper knuckle region of the finger. The second fixation portion 210 may be installed on each of the front and rear surfaces. For example, the second fixation portion 210 fixing the 2-2 wire 221b, 223b may be installed above the DIP joint of the index finger as shown in FIGS. 9A and 9B.

In one embodiment, the second front wire 221 and the second rear wire 223 disposed on the same finger may be respectively connected to different pairs of the second actuator modules 230. In this case, the pair of second actuator modules 230 further includes a single rotation body.

One end of the 2-2 front wire 221b in the second exglove module 200 is connected to any one of the pairs of 2-2 actuator modules 230b located at the wrist (for example, module 3 in FIG. 9A). Then, one end of the 2-2 rear wire 223b is connected to the rest of the pairs of 2-2 actuator modules 230b located at the wrist (for example, module 9 in FIG. 9B).

Then, as shown in FIGS. 9A and 9B, ten second actuator modules 230 may be included.

In another embodiment, the second front wire 221 and the second rear wire 223 disposed on the same finger may be connected to a single second actuator module 230. In this case, the single second actuator module 230 includes first and second rotation bodies 231, 233. In some embodiments, the pair of second wires 221, 223 may be connected to the second actuator module 230 so that the tension of the second front wire 221 increases and the tension of the second rear wire 223 decreases by the rotation of the second actuator module 230 in one direction or the tension of the second front wire 221 decreases and the tension of the second rear wire 223 increases by the rotation of the second actuator module 230 in the other direction.

Hereinafter, the second exglove module 200 will be described in more detail with the embodiments including ten second actuator modules 230 in order to clarify the description.

The pair of second actuator modules 230 related to any one finger is driven so that the tension of the front wire 221 increases and/or the tension of the rear wire 223 decreases in the pair of second wires in order to allow the flexion of the finger toward the palm of the hand and the tension of the front wire 221 decreases and/or the tension of the rear wire 223 increases in the pair of second wires in order to allow the extension of the finger toward the back of the hand.

Figure 10:
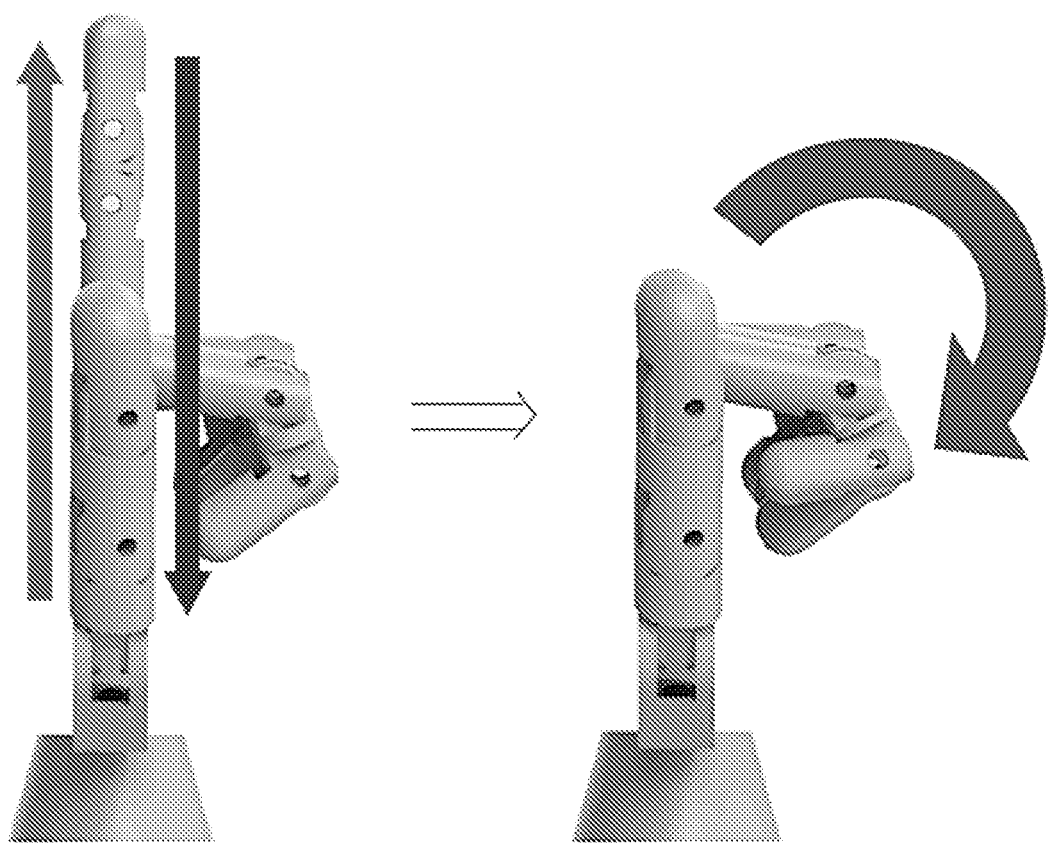
FIG. 10 is a diagram illustrating a flexion/extension operation of an index finger part by the second exglove module of FIG. 9.

FIG. 10 is a diagram illustrating the flexion/extension operation of the index finger part by the second exglove module of FIG. 9.

When any one of the pair of 2-2 actuator modules 230b winds the 2-2 front wire 221b, the strength of the tension of the 2-2 front wire 221b increases. In contrast, when the 2-2 front wire 221b is released, the strength of the tension of the 2-2 front wire 221b decreases.

When the rest of the pair of 2-2 actuator modules 230b winds the 2-2 rear wire 223b, the strength of the tension of the 2-2 rear wire 223b increases. In contrast, when the 2-2 rear wire 223b is released, the strength of the tension of the 2-2 rear wire 223b decreases.

When the tension of the 2-2 front wire 221b increases and/or the tension of the 2-2 rear wire 223b decreases, the flexion of the upper knuckle and/or the middle knuckle of the index finger toward the palm of the hand is allowed.

In contrast, when the tension of the 2-2 front wire 221b decreases and/or the tension of the 2-2 rear wire 223b increases, the extension of the upper knuckle and/or the middle knuckle of the index finger toward the back of the hand is allowed.

When the front 2-2 actuator module 230b is driven to wind the 2-2 front wire 221b and/or the rear 2-2 actuator module 230b is driven to release the 2-2 rear wire 223b, the flexion of the upper knuckle and/or the lower knuckle of the index finger is allowed as shown in FIG. 10.

Since the operations of the other second wires 221a, 221c, 221d, 221e, 223a, 223c, 223d, 223e and the other second actuator modules 230a, 230c, 230d, 230e are similar to the operations of the 2-2 wire and the 2-2 actuator module, detailed description will be omitted.

In specific embodiments, the actuator module 30 of a part or all of the second exglove modules 200 may include a plurality of (for example, two) motors 35. The remaining actuator modules 30 of the second exglove module 200 may include a single motor 35. For example, the actuator module connecting the wires of the thumb, the index finger, and the middle finger may include two motors and the actuator module connecting the wires of the ring finger and the little finger may include a single motor.

Since the wearable robot hand device 1 includes the first exglove module 100 and/or the second exglove module 200 described above, it is possible to implement the hand motion of the hand structure 20 according to the function of the intrinsic muscle and/or the extrinsic muscle.

Figure 11:
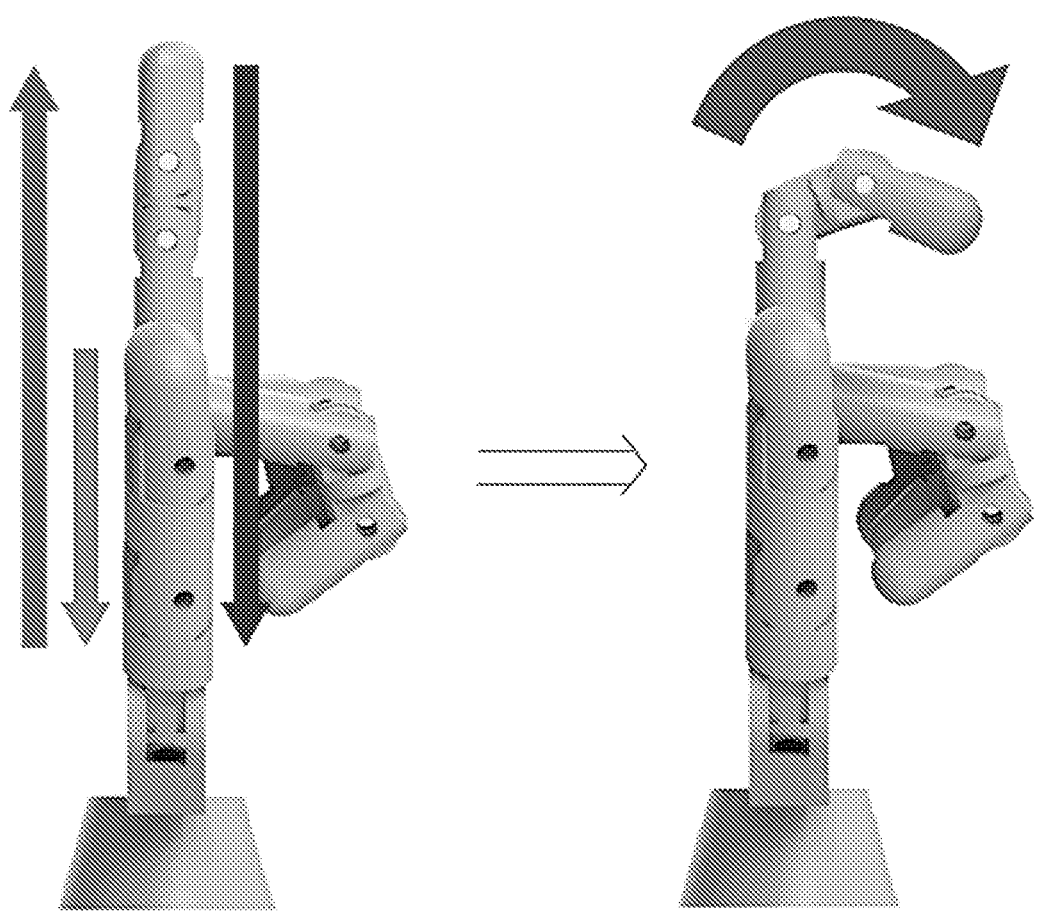
FIG. 11 is a diagram showing an operation of a robot hand that wears the wearable robot hand device including the first exglove module and the second exglove module.

FIG. 11 is a diagram showing an operation of the robot hand that wears the wearable robot hand device including the first exglove module and the second exglove module.

Referring to FIG. 11, the first exglove module 100 applies tension to the 1-3 rear wire 123c so that the extension of one knuckle (for example, the lower knuckle) of the index finger toward the back of the hand is allowed. Furthermore, the second exglove module 200 applies tension to the 2-2 front wire 221b and/or reduces the tension on the 2-2 rear wire 223b so that the flexion of the index finger toward the palm of the hand is allowed. The knuckle at the lower end of the index finger is directed toward the fingertip by the combination of the operation result of the first exglove module 100 and the operation result of the second exglove module 200, but the knuckles at the middle end and the upper end may implement the bent hand motion.

Figure 12:
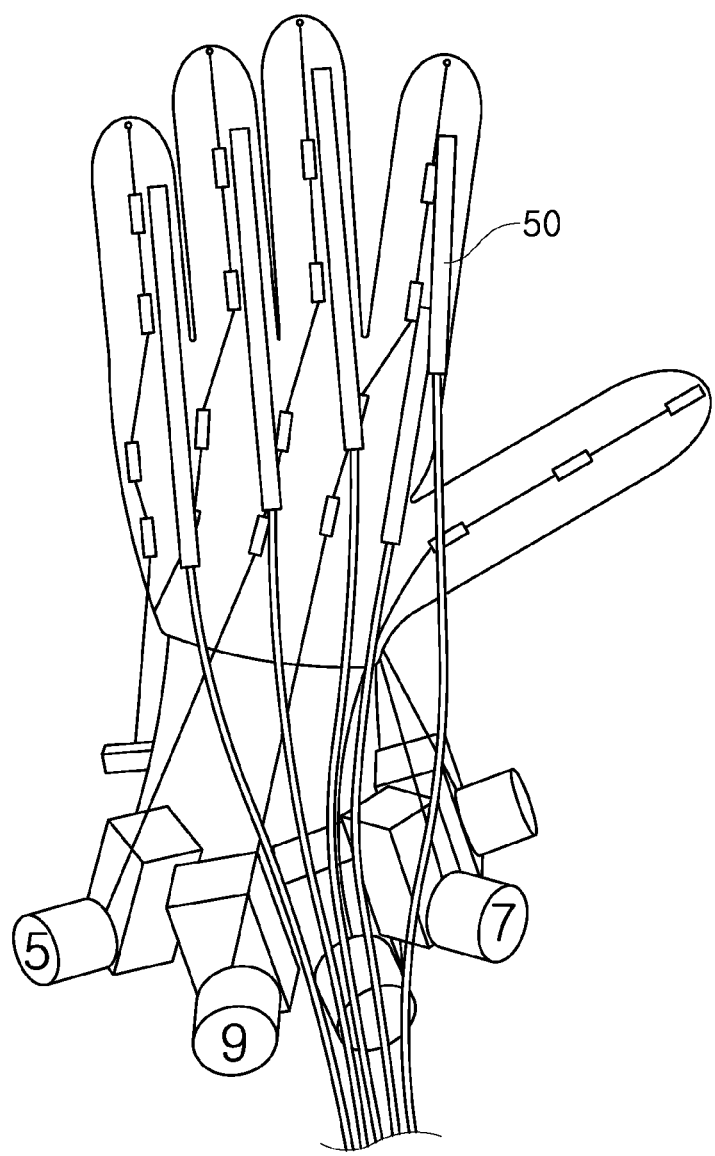
FIG. 12 is a schematic view of the wearable robot hand device including a sensor according to one embodiment of the present disclosure.

FIG. 12 is a schematic view of the wearable robot hand device including a sensor according to one embodiment of the present disclosure.

Referring to FIG. 12, the wearable robot hand device 1 may include one or more sensors 50. The sensor 50 is disposed on the exglove. For example, as shown in FIG. 12, the sensor may be disposed on the second exglove module 200.

The sensor measures the degree of flexion of the flexion portion in the hand structure. Based on the flexion portion and the degree of flexion at the portion, the currently implemented hand motion may be estimated.

In one embodiment, the sensor 50 may be a strain sensor. For example, the sensor 50 may be a flex sensor, but is not limited thereto.

The detection range of the sensor 50 includes joints and knuckles in the periphery of the joints. When the strain is calculated after the flexion around the joint in a state where information on the knuckle in the periphery of the joint (for example, the length, thickness, and the like of the knuckle) is acquired in advance, the angle between the knuckles is calculated. Specifically, the flexion angle between the knuckles may be calculated by calculating a change amount of the knuckle length based on the strain and calculating the curvature of the bent knuckle.

The detection result of the sensor 50 may be used to set the drive signal for driving the actuator module 130, 230.

When the flexion angle is calculated from the detection result of the sensor 50 depending on the hand motion, a relationship between the detection result of the sensor and the flexion angle may be modeled. Then, a desired hand motion may be implemented by controlling the actuator module 130, 230 based on the modeled relationship.

Figure 13:
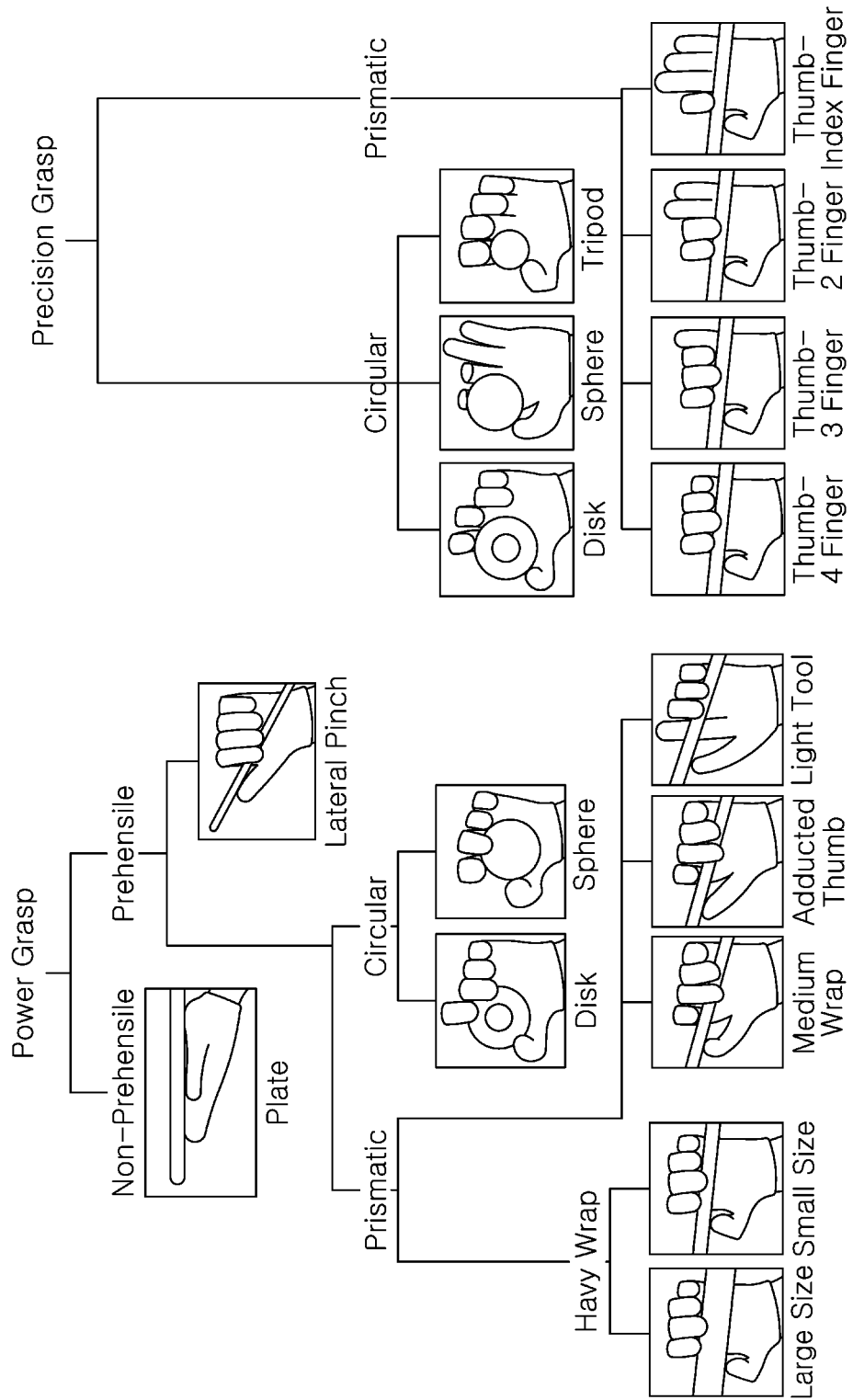
FIG. 13 is a diagram showing a finger operation that may be implemented by the wearable robot hand device including the first and second exglove modules according to one embodiment of the present disclosure.

FIG. 13 is a diagram showing a hand motion that may be implemented by the wearable robot hand device including the first and second exglove modules according to one embodiment of the present disclosure.

Referring to FIG. 13, all functions of the intrinsic muscle and the extrinsic muscle may be implemented by the first and second exglove modules 100, 200 and five fingers may be independently controlled. As a result, the hand motion of the hand structure 20 may be implemented so that the hand structure 20 holds various circular objects such as disks and balls. In addition, all of sixteen hand motions shown in FIG. 13 may be implemented.

In this way, the wearable robot hand device 1 is manufactured as the wearable robot hand device capable of implementing various hand motions by individually controlling the fingers of the hand structure 20. As a result, the wearable robot hand device can be applied to many robot hands and do not affect the length of the robot arm connected to the robot hand compared to the conventional robot hand including a manipulator or an actuator installed therein.

Also, the wearable robot hand device can be applied to the human hand and be used to assist the human hand motion.

In the above-described specific embodiments, components included in the present disclosure are expressed in singular or plural according to the presented specific embodiments. However, the singular or plural expression is selected appropriately for the situation presented for convenience of description and the above-described embodiments are not limited to the singular or plural components. Even a component expressed in plural can be composed of a singular number or a component expressed in a singular can be composed of plural number.

Meanwhile, although specific embodiments have been described in the description of the present disclosure, various modifications can be made without departing from the scope of the technical idea implied by the various embodiments. Therefore, the scope of the present disclosure should not be limited and determined by the embodiments described above, but should be determined not only by the claims to be described later but also by the claims and equivalents.

Detailed Description of Main Elements

1: Robot hand device
20: Hand structure
50: Sensor
100, 200: Exglove module
30, 130, 230: Actuator module
21, 121, 221: Front wire
23, 123, 223: Rear wire
31, 131, 231: First rotation body
33, 133, 233: Second rotation body
35, 135, 235: Motor

The invention claimed is:

1. A wearable robot hand device removable from a hand structure, comprising:
 first and second exglove modules attached to the hand structure, the first exglove module being attached to a surface of the hand structure and the second exglove module being attached to the first exglove module, wherein each of the first or second exglove modules includes:
an exglove covering a part or all of the hand structure;
a plurality of wires disposed on front and rear surfaces of the hand structure;
a plurality of fixation portions fixing the plurality of wires; and
a plurality of actuator modules controlling tension of the plurality of wires; and
wherein the first exglove module includes:
a first exglove covering a palm region of the hand structure and at least a part of a thumb of the hand structure and a part of a finger of the hand structure, and leaving at least another finger of the hand structure uncovered.

2. The wearable robot hand device according to claim 1, wherein the first exglove module further includes:
one or more pairs of first wires disposed on the first exglove on the front and rear surfaces of the hand structure; and
one or more first actuator modules connected to the one or more pairs of first wires,
wherein the one or more pairs of first wires includes one or more of a pair of 1-1 wires and a pair of 1-2 wires,
wherein a 1-1 wire of the one or more of the pair of 1-1 wires allows flexion of the palm region near the thumb toward a palm of the hand structure or extension of the palm region toward a back of the hand structure, and
wherein a 1-2 wire of the one or more of the pair of 1-2 wires allows adduction or abduction of the thumb.

3. The wearable robot hand device according to claim 2, wherein the one or more pairs of first wires further include a pair of 1-3 wires, and
wherein the pair of 1-3 wires allows flexion of one knuckle of a finger toward the palm of the hand structure or extension thereof toward the back of the hand structure.

4. The wearable robot hand device according to claim 3, wherein a 1-1 actuator module connected to the pair of 1-1 wires or a 1-3 actuator module connected to the pair of 1-3 wires includes a motor and first rotation body and a second rotation body rotated by the motor, a front wire is connected to the first rotation body, and a rear wire is connected to the second rotation body, and
wherein the front wire and the rear wire are connected to the first rotation body and the second rotation body so that a tension of the front wire increases and a tension of the rear wire decreases by rotation of the 1-1 or 1-3 actuator module in one direction or the tension of the front wire decreases and the tension of the rear wire increases by the rotation of the 1-1 or 1-3 actuator module in another direction.

5. The wearable robot hand device according to claim 4, wherein the first rotation body and the second rotation body rotate in a same direction by the motor and the front wire and the rear wire are connected to each other while being wound in different directions.

6. The wearable robot hand device according to claim 2, wherein a 1-2 actuator module connected to a pair of the one or more of the pair of 1-2 wires includes a motor and first and second rotation bodies rotated by the motor, and
wherein a front wire and a rear wire are connected to the first and second rotation bodies so that the adduction of the thumb toward a fingertip is allowed when a tension of the front wire or the rear wire increases.

7. The wearable robot hand device according to claim 1, wherein when the first exglove module and the second exglove module are attached to the hand structure, extension of a lower knuckle of at least one finger of the hand structure toward a back of a hand of the hand structure is allowed by the first exglove module and flexion of an upper knuckle or a middle knuckle of the at least one finger of the hand structure toward a palm of the hand of the hand structure is allowed by the second exglove module.

8. The wearable robot hand device according to claim 1, further comprising:
one or more sensors measuring a flexion angle of a flexion portion in the hand structure,
wherein a drive signal of the actuator module is based on a relationship between the flexion angle and a detection result of the sensor.

9. A wearable robot hand device removable from a hand structure, comprising:
at least one of first and second exglove modules as one or more exglove modules attached to the hand structure, the first exglove module being attached to a surface of the hand structure and the second exglove module being attached onto an exglove of the first exglove module,
wherein each of the first or second exglove modules includes:
an exglove covering a part or all of the hand structure;
a plurality of wires disposed on front and rear surfaces of the hand structure;
a plurality of fixation portions fixing the plurality of wires; and
a plurality of actuator modules controlling tension of the plurality of wires;
wherein the second exglove module includes:
a second exglove covering a finger of the hand structure;
one or more pairs of second wires disposed on the second exglove on the front and rear surfaces of the hand structure; and
one or more second actuator modules connected to the one or more pairs of second wires,
wherein the one or more pairs of second wires includes one or more pairs of 2-1 to 2-5 wires, and
wherein the pair of 2-1 wires is disposed on a thumb of the hand structure, the pair of 2-2 wires is disposed on an index finger of the hand structure, the pair of 2-3 wires is disposed on a middle finger of the hand structure, the pair of 2-4 wires is disposed on a ring finger of the hand structure, and the pair of 2-5 wires is disposed on a little finger of the hand structure.

10. The wearable robot hand device according to claim 9, wherein when a second actuator module of the one or more second actuator modules includes a motor and a first rotation body and a second rotation body rotated by the motor, a front wire is connected to the first rotation body and a rear wire is connected to the second rotation body in a second wire of the one or more pairs of second wires.

11. The wearable robot hand device according to claim 9, wherein when a second actuator module of the one or more second actuator modules includes a motor and a rotation body rotated by the motor, the second exglove module includes a pair of second actuator modules controlling flexion or extension of the finger of the hand structure, and a front wire and a rear wire in a second wire of the one or more pairs of second wires are respectively connected to the pair of second actuator modules.

12. The wearable robot hand device according to claim 11, wherein the pair of second actuator modules is driven so that a tension of the front wire increases or a tension of the rear wire decreases in a pair of second wires of the one or more pairs of second wires in order to allow the flexion of the finger of the hand structure toward a palm of the hand structure and the tension of the front wire decreases or the tension of the rear wire increases in the pair of second wires of the one or more pairs of second wires in order to allow the extension of the finger of the hand structure toward a back of the hand structure.

* * * * *